Jan. 14, 1958  J. A. RANTA  2,819,911
SEMI-TRAILER WITH STEERABLE INTERMEDIATE WHEEL ASSEMBLY
Filed April 2, 1956  2 Sheets-Sheet 1
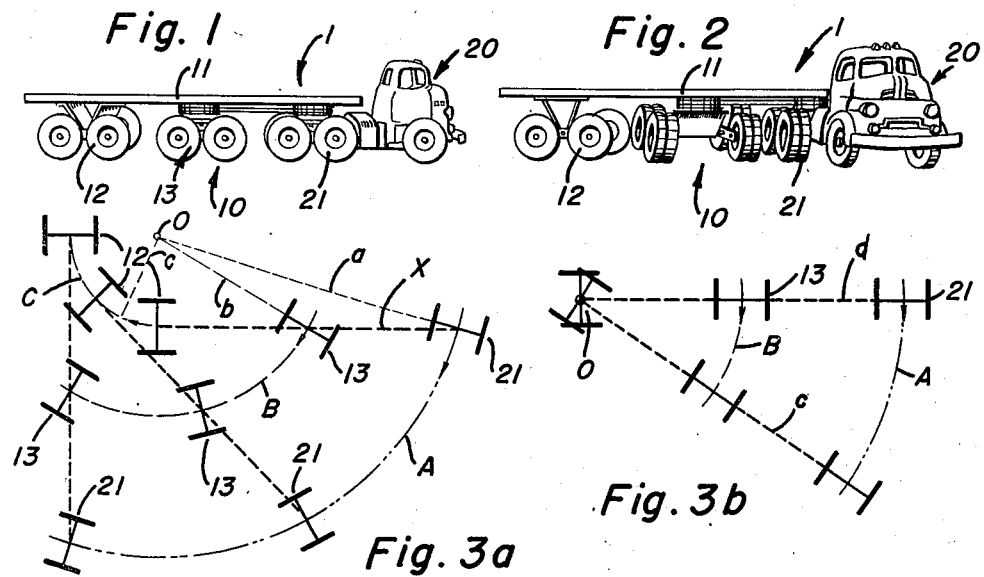
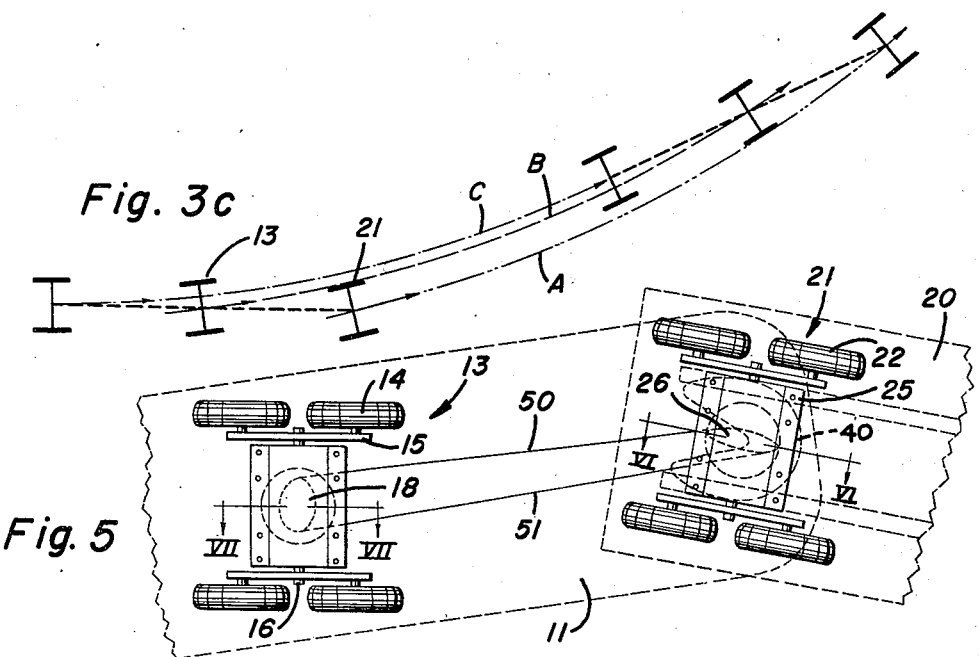
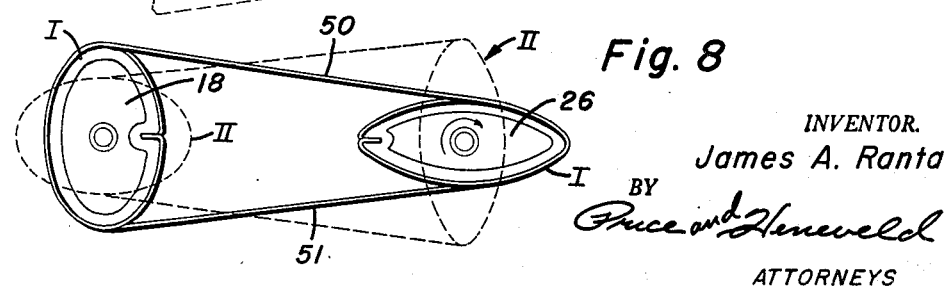
INVENTOR.
James A. Ranta
BY
ATTORNEYS Jan. 14, 1958   J. A. RANTA   2,819,911
SEMI-TRAILER WITH STEERABLE INTERMEDIATE WHEEL ASSEMBLY
Filed April 2, 1956   2 Sheets-Sheet 2

INVENTOR.
James A. Ranta
BY
*Price and Heneveld*
ATTORNEYS

_United States Patent Office_

2,819,911
Patented Jan. 14, 1958

2,819,911
SEMI-TRAILER WITH STEERABLE INTERMEDIATE WHEEL ASSEMBLY

James A. Ranta, Grand Rapids, Mich.

Application April 2, 1956, Serial No. 575,680

4 Claims. (Cl. 280—426)

This invention relates to a novel type truck trailer designed for carrying heavier loads. More particularly this invention relates to a specific means for steering the center assembly of a truck trailer.

With the advent of the automobile and large automotive trucks, the building of suitable highways for both of these vehicles has created quite a problem. Due to the prohibitive cost of building highways designed for withstanding unlimited loads, most highways are designed for certain maximum loads and thus the government has passed laws restricting a maximum permissible load which a truck may carry on the highway.

Highways break down only if a certain load is exceeded at any one point. Therefore, the laws are usually based upon formulas which depend upon the load per unit wheel. Thus, the total permissible load depends upon the number and width of the wheels. In order to abide with these rules and regulations, the automotive trucking industry in facing this problem has devised several different methods of increasing the load on any given truck. These methods and arrangements are too numerous to discuss or relate in any detail.

An object of this invention is to provide a means for distributing the load on a truck trailer so that greater loads can be carried by the trailer within the requirements of the rules and regulations of the government.

Still another object of this invention is to provide an intermediate wheel assembly for a semi-truck trailer, such wheel assembly being located in an appropriate position for distributing the load on the trailer and thus increasing the maximum permissible load.

Another object of this invention is to provide a means for steering a center wheel assembly by the tractor of the truck in order that the truck can take corners without skidding or slipping of the center wheel assembly.

Still another object of this invention is to provide a novel mechanism for steering the intermediate wheel assembly, said mechanism having a compensating means so as to give the proper degree turn of the assembly for all degree turns of the truck tractor.

Other objects of this invention will become obvious upon reading the following specification in conjunction with the accompanied drawings wherein:

Fig. 1 is a side elevational view of the trailer truck.

Fig. 2 is a side elevational view of the truck as it is making a turn.

Fig. 3a is a schematic illustration of the position of the wheels in relation to each other when the truck is turning at an angle more than 90°.

Fig. 3b is a schematic illustration of the position of the wheels in relation to each other when the truck is turning at exactly 90°.

Fig. 3c is still another schematic illustration of the relative position of the wheels when the truck is turning at an angle less than 90°.

Fig. 5 is a plan view of the intermediate wheel assembly and the rear tandem wheel assembly of the tractor.

Fig. 8 is a schematic illustration of the arrangement of the cam or drum means for accomplishing the steering of the intermediate wheel assembly by the tractor.

Figure 7:
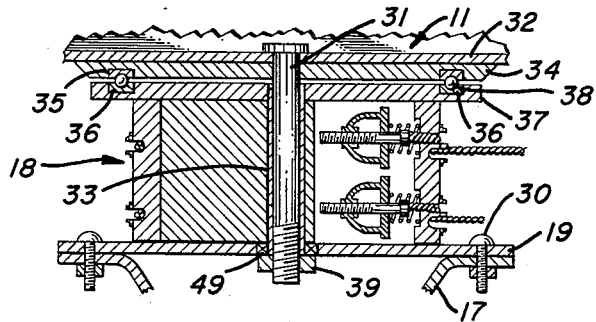
Fig. 7 is a fragmentary, cross sectional view of the turntable for the intermediate wheel assembly taken along the plane VII—VII of Fig. 5.

Briefly this invention is concerned with a truck trailer for carrying heavy loads. As previously described various apparatuses and means have been developed for increasing the maximum permissible loads on trailer trucks. I provide an intermediate wheel assembly located between the rear wheels and the tractor. This wheel assembly is rotatable with respect to the body of the trailer whereby when the tractor turns the center set of wheels is permitted to turn in the same direction. My invention relates to the means for properly steering the intermediate wheel assembly regardless of degree the tractor turns. I have discovered that for substantially all degree turns of the tractor the relative degree turn of the intermediate wheel assembly is different and this difference varies. Therefore the operative means for connecting the tractor to the center wheel assembly has a novel compensating means for providing the exact degree turn of the center set of wheels in relation to the degree turn of the tractor.

Referring to the drawings, reference numeral 1 denotes the truck which includes the trailer 10 and the tractor 20. The trailer 10 consists of a body or platform 11 supported by a rear set of wheels 12 and pivotally connected at the front to the tractor 20 by any modified conventional fifth wheel arrangement. An intermediate or center wheel assembly 13 is located between the rear wheel assembly 12 and the wheel assembly 21 of the tractor 20. This center wheel assembly as illustrated in Fig. 2 is rotatable on the body 11 and steerable with the tractor 20. As in a conventional trailer, the rear wheel assembly 12 is rigidly connected to the body 11.

I have discovered that when the truck negotiates a curve, in order to avoid skidding the turning of the intermediate wheel assembly 13 is of necessity directly related to the turning of the tractor wheel assembly 21; but the amount of turn varies with the degree turn of the tractor. This is illustrated in Figs. 3a, 3b and 3c.

Fig. 3a schematically represents the relative position of the wheels when the truck is making a turn at an angle greater than 90°. As near as can be determined, when the wheel assembly 21 follows the path A the wheel assemblies 13 and 12 follow substantially the paths B and C, respectively. The paths A, B and C are substantially concentric about a point such as O. Therefore, the direction of travel of each wheel assembly as indicated by the arrow is perpendicular to the radius lines a, b, and c. The intermediate wheel assembly 13 leads the tractor wheel assembly 21. Therefore, the angle which the direction of travel of the wheel 13 makes with the axis x of the body 11 is greater than the direction of travel of the wheel assembly 21 makes with the axis x. Accordingly, at degree turns of more than 90° the wheel asembly 13 is turned a greater angle than the wheel assembly 21. This has been found to be true for all degree turns greater than 90°.

Fig. 3b illustrates that when the tractor wheel assembly 21 is turned at 90° the intermediate wheel assembly 13 also has to be turned at exactly 90°. The same reasoning applied to Fig. 3a is also applicable here. In this particular case the paths A and B of the wheel assemblies are concentric about the center O. The direction of the travel indicated by the arrows is perpendicular to the same radius line d. As a result the arrows are parallel to each other and thus the wheel assemblies 13 and 21 are turned exactly the same degree.

Fig. 3c illustrates the relative degree turn of the wheels for angles less than 90°. I have found for turns less than 90° the intermediate wheel assembly 13 should turn at an angle less than the tractor in order to prevent any skidding or slipping. In this particular case the paths A, B and C all lie substantially on concentric circles. The tractor wheel assemblies 21 lead the intermediate wheel assemblies 13. As a result, the intermediate wheel assembly 13 is turned a less degree than the tractor wheel assembly 21.

Considering Figs. 3a, 3b and 3c, it should be evident that in turning the truck in accordance with this invention, for angles less than 90° the intermediate wheel assembly will turn at an angle less than the tractor. For a 90° turn of the tractor the intermediate wheel assembly 13 also turns 90°. However, for turns of the tractor which exceed 90°, the intermediate wheel assembly turns at a greater angle than the tractor. It has been found that the amount turn of the intermediate wheel assembly, although less at turns below 90°, progressively increases. Eventually at 90° the amount of turning is identical. At turns greater than 90° the amount turn of the intermediate wheel asembly exceeds the amount turn of the tractor. Accordingly, it is necessary in accordance with this invention I provide a novel type compensating means which will give the proper amount turn of the intermediate wheel assembly in relation to the turning of the tractor.

It should be understood that although I have illustrated and described a specific relation between the amount turn of the intermediate wheel assembly and the tractor wheel assembly, the exact relation as illustrated in the drawings is not necessarily correct for all purposes. Numerous factors have to be taken into account in determining the relative degree of turns of the tractor and the intermediate wheel assembly. For example, the position of the intermediate wheel assembly in relation to the rear and tractor wheels has a great effect upon the relative degree turns of the wheels. The length of the trailer also has its effect. Therefore, it should be understood that the schematic illustrations of Figs. 3a, 3b and 3c should be taken only as an illustration.

According to this invention, the mechanism for creating the proper turn of the intermediate wheel assembly constitutes a drum turnable or rotatable with the tractor and a second drum which steers or rotates the intermediate wheel assembly. The two drums are operatively connected by cables so that when the trailer turns the intermediate wheel assembly turns. The drum surfaces on which the cables ride vary in pitch or shape in order to compensate for the proper degree turn of the intermediate wheel assembly in relation to the degree turn of the tractor. Fig. 5 illustrates this mechanism.

In Fig. 5, reference number 21 designates the tractor wheel assembly of the tractor 20. Intermediate wheel assembly is denoted by reference numeral 13. These two wheel assemblies are each the so-called tandem type which includes two pairs of wheels, one pair on each side.

Tractor wheel assembly 21 includes the wheels 22 for supporting and driving the tractor. The trailer 10 is connected to the tractor by a fifth wheel 40 mounted on the frame 25. A drum 26 is directly connected to the fifth wheel of the tractor 20, as will be explained in more detail hereinafter. The drum 26 turns with the tractor wheel assembly 21.

Figure 4:
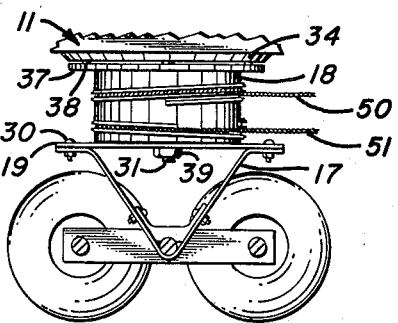
Fig. 4 is an enlarged, elevational view of the intermediate wheel assembly.
Figure 9:
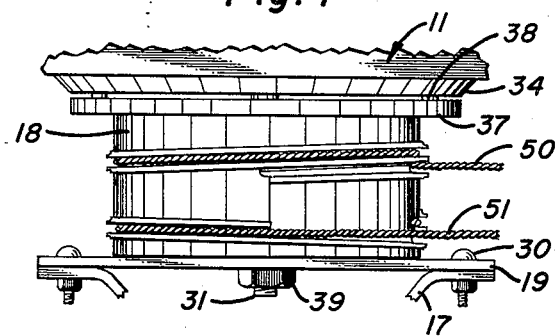
Fig. 9 is an enlarged elevational view of the drum for the intermediate wheel assembly.

The intermediate wheel assembly 13 is similar in design to the rear tandem wheel assembly 12. As illustrated, it consists of two wheels 14 on each side of a frame which includes the walking beams 15, the main axle 16 and the pedestal 17 (Fig. 4). A drum 18 is supported directly on top of the pedestal 17. The entire intermediate wheel assembly 13 including the drum is rotatably mounted on the bottom surface of the body 11.

The rotatable movement of the wheel assembly 13 in relation to the body 11 is preferably accomplished by the structure detailed in Figs. 4 and 7. The drum 8 consists of two end plates 19 and 37. The bottom end plate 19 is secured to the pedestal 17 by the bolts 30. A center pin 31 is secured to the bottom surface 32 of the body 11. It extends downwardly for receiving the drum 18 which is rotatably mounted about the pin 31 by a bearing 33. A turntable plate 34 is secured directly to the bottom surface 32 of the body 11. It has the inserts 35 which in cooperation with the inserts 36 of the top plate 37 of drum 18 provide a race for ball bearings 38. The bearings 38 rotatably mount the plate 37 on the turntable plate 34. The drum and wheel assembly is secured to the pin 31 by the nut 39 which bears against the thrust bearing 49. The entire arrangement in Fig. 7 provides a means for rotatably mounting the intermediate wheel assembly to the bottom surface of the body 11.

Figure 6:
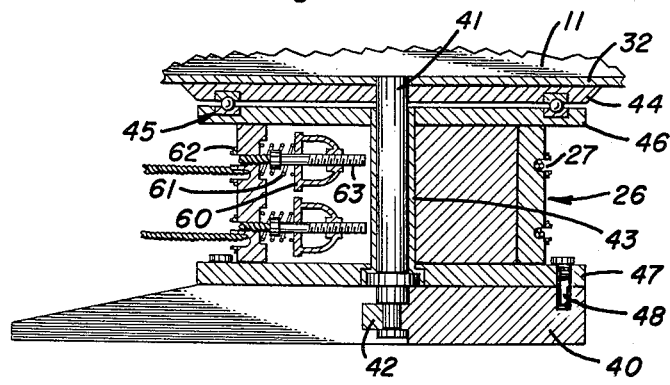
Fig. 6 is a fragmentary cross sectional view of the pivotal connection at the fifth wheel taken along the plane VI—VI of Fig. 5.

A preferred arrangement of the drum 26 in relation to the fifth wheel of tractor 20 is illustrated in Fig. 6. In Fig. 6 reference numeral 40 indicates the fifth wheel which is secured to the tractor 20 (not shown) in any conventional manner. A pintle 41 rotatably secures the front end of body 11 to the fifth wheel. The pintle 41 is received by a slot (not illustrated) of the fifth wheel and is held therein by the retainer member or hook 42. Ordinarily the bottom surface 32 of the body 11 rests directly on the fifth wheel 40, lubricating means being supplied to permit free rotatable movement therebetween. In accordance with this invention the drum 26 is rotatably mounted on the pintle 41 by the bearing 43. It is secured to the fifth wheel 40 by pins 48 which permit normal rocking of the fifth wheel.

A turntable plate 44 is secured directly to the bottom surface 32 of the body 11. The ball bearing assembly 45, of similar design to that of Fig. 7, permits relative movement between the turntable plate 44 and the top end plate 46 of drum 26. The bottom end plate 47 of drum 26 is removably secured to the fifth wheel 40 by pins 48. With this arrangement the entire pintle and drum can be secured to or disengaged from the tractor 20.

The two drums 18 and 26 are operatively connected together by the cables 50 and 51. Thus, when the tractor 20 turns the intermediate wheel assembly 13 also turns. As explained previously the quantum of turn of the intermediate wheel assembly 13 changes in accordance with the degree turn of the tractor. Therefore, the surface of the drums on which the cables 50 and 51 ride change in accordance with the desired relative degree turn of the wheel units. Figs. 5 and 8 illustrate the comparative shapes of the two drum surfaces. It is important that in straight ahead position the drum 26 is elongated along the axis of the tractor and drum 18 is elongated transversely to the axis of the trailer 10. These exact shapes shown were developed and computed in accordance with the position of the wheel assemblies as illustrated in Figs. 3a, 3b and 3c.

The relative shapes of the surfaces of drums 26 and 18 provide that for each degree rotation of drum 26, from 0° (position I) to 90° (position II), a greater length of cable is wound on drum 26 than is unwound from drum 18. However, when drum 16 is rotated by turning tractor 20 the same length of cable is unwound from drum 18 as is wound on drum 26. Thus, in rotating drum 26 a certain number of degrees, the drum 18 rotates a less number of degrees per length of cable. This difference in the degree rotation of the drums becomes progressively smaller in rotating the drums from 0° to 90° until at 90° (position II) the difference is zero or in other words the drums rotate exactly the same degree.

Over 90° (position II), this relationship reverses. For each degree rotation of drum 26, a greater length cable is unwound from drum 18. Thus, since the same length cable is being unwound from drum 18 as is wound on drum 26, drum 18 rotates a greater number of degrees than drum 26.

The above relationship should be clear from reviewing and comparing the surface shapes of drums 18 and 26. Drum 26 in rotating from the position I must rotate in either direction a comparatively large number of degrees in order to wind on it a small segment of cable 50 or 51. In winding this segment on itself, drum 26 unwinds an identical length segment from drum 18. It will be readily recognized, however, that unwinding this same segment from drum 18 results in a comparatively less degree rotation of drum 18. This difference in degree turn results from the different slopes of the surfaces on and off which the cables ride. It should be equally clear from the drawings that in rotating drum 26 more than 90° (position II) the relative slope of the surfaces is the inverse from that existing in a 0° to 90° turn.

Figure 8A:
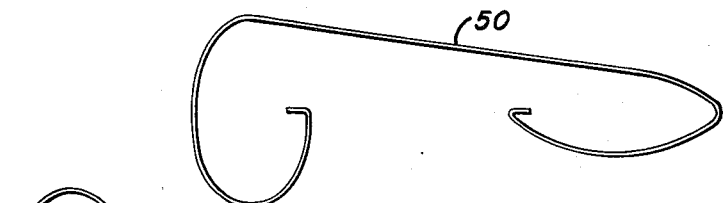
Figs. 8a and 8b are schematic sketches of the cable arrangement of Fig. 8.
Figure 8B:
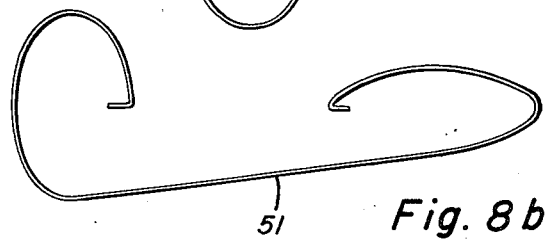

Figs. 8a and 8b illustrate the arrangement of the cables. It will be noted that cable 50 in straight ahead position of drum 26 and drum 18, is wound around drum 26 and drum 18 approximately 270°. This is also true of cable 51; however, the two cables 50 and 51 are wound in opposite directions so that cable 50 will rotate drum 18 in one direction and cable 51 will rotate drum 18 in the other direction.

The cables ride in the helical grooves 27 in the surfaces of the drums. The grooves 27 are arranged so that the cable can be wound or unwound on either of the drums. Flanges 62 are provided to help keep the cables in the grooves.

The cables, in straight ahead position of tractor 20, are wrapped 270° about each drum (Figs. 8, 8a, and 8b). Thus, they are secured substantially at the same circumferential point, which arrangement provides a balanced system regardless of the rotatable position of the drums.

The cables are connected to the drums by a resilient connection illustrated in Figs. 6 and 7. This resilient connection consists of spring 61 and an adjustable bearing plate 60 connected to the end of the cable extending through a wall of the drum. The spring 61 eliminates snapping of the cable due to sudden turns of the tractor 20. The spring 61 is a rigid strong helical spring which will normally resist compression but upon any sudden jerk on the cable the spring will be compressed preventing the cable from being snapped. The adjustable bearing plate 60 is adjustable on the threaded stud 63 which is secured to the end of the cable. This provides a means for taking up slack in the cable.

Figure 10:
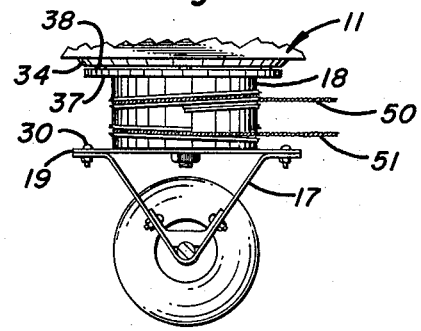
Fig. 10 is a modified intermediate wheel assembly.

Fig. 10 shows a modified form of the intermediate wheel assembly. It is identical to the assembly of Figs. 4 and 5 except that only a pair of wheels is provided rather than the tandem arrangement previously described. It should be understood that the number of wheels on the intermediate wheel assembly can be varied without departing from the scope of this invention. It is conceivable to use six wheels rather than four as previously described.

*Operation*

Having described my invention, the operation is simple. The intermediate wheel assembly can be a permanent fixture or can be removable in which case it is used only when heavy loads are carried. With the assembly in place as previously described, and the cables attached to the drums, the front of the trailer is secured to the fifth wheel 40 in the conventional manner of sliding the pintle into the slot of the fifth wheel and securing it in the fifth wheel by the retaining hook 42. The tractor is then permitted to turn in relation to the trailer. Having secured the pintle to the fifth wheel 40, the pins 48 are installed securing the drum 26 to the fifth wheel and the tractor. The drum 26 is thus rotatable with respect to the wheel assembly 21 of the tractor 20. As a result, as the tractor 20 is turned the drum 26 will turn.

The drum 26 is operatively connected to the drum 18 of the intermediate wheel assembly 13 by the cables 50 and 51 in the manner previously described. Thus rotation of the drum 26 rotates the drum 18.

The drums 26 and 18 have surfaces shaped in the manner previously described so as to provide the proper degree turn of the intermediate assembly 13. In all cases, it is necessary that during the first 90° turn, the intermediate wheel assembly 13 turn a less degree than the tractor wheel assembly 21 and but that this difference in degree turn progressively decrease until at a 90° turn of the tractor the intermediate wheel assembly 13 also is turned at exactly 90°. Turns of greater than 90° require that the intermediate wheel assembly 13 turn at a greater angle than the tractor wheel assembly 21.

This intermediate wheel assembly provides additional wheels for bearing the load of the trailer. Accordingly, the formulas based on the number of wheels permits overall heavier loads to be carried.

It should be understood that although I have described a preferred embodiment of this invention, other embodiments and modifications can be adapted without departing from the scope of this invention. This invention should, therefore, only be limited as expressly provided in the appended claims.

I claim:

1. A tractor and trailer combination, said trailer having a center wheel assembly, and a steering mechanism for the center wheel assembly of the trailer connected to a tractor, said steering mechanism comprising: an elongated helical grooved drum connected directly to said tractor; a second elongated helical grooved drum connected directly to said center wheel assembly; a pair of cables each having respective ends wrapped about said drums in said helical grooves substantially more than 90°; said helical grooves being elongated along perpendicular axes when said tractor is headed straight or turned exactly 90° whereby said second drum and wheel assembly turns less than said first drum and tractor in turning from 0 to 90° and turns more than said first drum and tractor in turning over 90°.

2. A tractor and trailer combination, said trailer having a center wheel assembly, and a steering mechanism for the center wheel assembly of the trailer connected to a tractor, said steering mechanism comprising: an elongated helical grooved drum connected directly to said tractor; a second elongated helical grooved drum connected directly to said center wheel assembly; a pair of cables each having respective ends wrapped about said drums in said helical grooves substantially more than 90°; said cables passing through the walls of said drums and resiliently connected thereto whereby said resilient connection will absorb sudden jerks on said wire; said helical grooves of said tractor drum and said grooves in said trailer drum being orientated such that in the straight ahead position of the tractor the tractor drum grooves are elongated along the axis of the tractor and the trailer drum grooves are elongated transversely of the axis of the trailer whereby said second drum and wheel assembly turns less than said first drum and tractor in turning from 0 to 90 degrees and turns more than said first drum and tractor in turning over 90 degrees.

3. A tractor and trailer combination, said trailer having a center wheel assembly, and a steering mechanism for the center wheel assembly of the trailer connected to a tractor, said steering mechanism comprising: an elongated helical grooved drum connected directly to said tractor; a second elongated helical grooved drum connected directed to said center wheel assembly; a pair of cables each having respective ends wrapped about said drums in said helical grooves substantially more than 90°; said cables passing through said walls of said drums; bearing plates adjustably connected to the end of said cables; and spring means interposed between said bearing plates and said drum walls; said helical grooves of said tractor drum and said grooves in said trailer drum being oriented such that in the straight ahead position of the tractor the tractor drum grooves are elongated along the axis of the tractor and the trailer drum grooves are elongated transversely of the axis of the trailer whereby said second drum and wheel assembly turns less than said first drum and tractor in turning from 0 to 90 degrees and turns more than said first drum and tractor in turning over 90 degrees.

4. A tractor and trailer combination, said trailer having a center wheel assembly, and a steering mechanism for the center wheel assembly of the trailer connected to a tractor, said steering mechanism comprising: an elongated helical grooved drum connected directly to said tractor; a second elongated helical grooved drum connected directly to said center wheel assembly; a pair of cables each having respective ends wrapped about said drums in said helical grooves substantially 270° whereby each of said cables are secured to said drums at substantially the same circumferential point; said helical grooves being elongated along perpendicular axes when said tractor is headed straight or turned exactly 90° whereby said second drum and wheel assembly turns less than said first drum and tractor in turning from 0 to 90° and turns more than said first drum and tractor in turning over 90°.

References Cited in the file of this patent

UNITED STATES PATENTS

| | | |
|---|---|---|
| 2,433,269 | Fellabaum | Dec. 23, 1947 |
| 2,717,787 | Ward | Sept. 13, 1955 |

FOREIGN PATENTS

| | | |
|---|---|---|
| 787,127 | France | June 24, 1935 |